Figure 1:
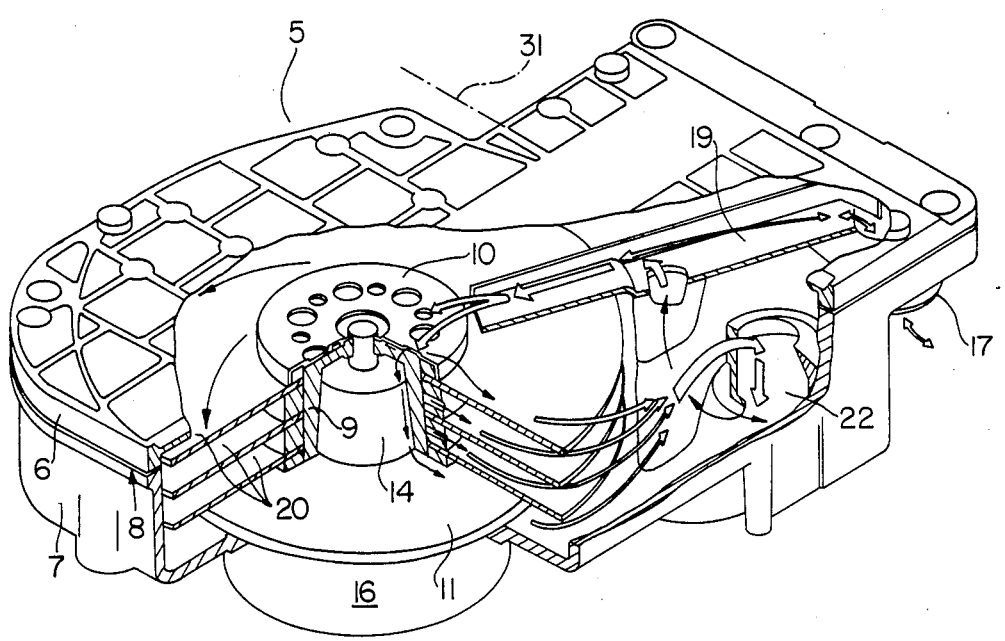

United States Patent [19]

Manzke et al.

[11] Patent Number: 4,680,656
[45] Date of Patent: Jul. 14, 1987

[54] PLURAL-DISK ROTATABLE DISK MEMORY WITH AIR CIRCULATION SYSTEM

[75] Inventors: Klaus Manzke, Westheim; Richard Schneider, Heidelberg; Lambert Kohl, Wachenheim, all of Fed. Rep. of Germany

[73] Assignee: BASF Aktiengesellschaft, Ludwigshafen, Fed. Rep. of Germany

[21] Appl. No.: 908,872

[22] Filed: Sep. 15, 1986

Related U.S. Application Data

[63] Continuation of Ser. No. 513,250, Jul. 13, 1983, abandoned.

[30] Foreign Application Priority Data

Jul. 15, 1982 [DE] Fed. Rep. of Germany ... 8220180[U]

[51] Int. Cl.$^4$ .............................................. G11B 5/012
[52] U.S. Cl. ......................................................... 360/98
[58] Field of Search ...................................... 360/97–99, 360/86, 133, 137; 206/444

[56] References Cited

U.S. PATENT DOCUMENTS

| | | | |
|---|---|---|---|
| 4,130,845 | 12/1978 | Kulma | 360/97 |
| 4,282,554 | 8/1981 | Ho et al. | 360/97 |
| 4,370,687 | 1/1983 | Shiraishi et al. | 360/98 |
| 4,412,261 | 10/1983 | Tateyama et al. | 360/98 |
| 4,418,369 | 11/1983 | Applequist et al. | 360/98 |
| 4,471,395 | 9/1984 | Beck et al. | 360/98 |

FOREIGN PATENT DOCUMENTS 2023236 11/1971 Fed. Rep. of Germany .

OTHER PUBLICATIONS

Reizo Kaneko et al., "Development of 800 Mega Byte Disk Drive", Review of the Electrical Communication Laboratories, vol. 28, Nos. 5–6, May–Jun. 1980, pp. 368–380.

*Primary Examiner*—John H. Wolff
*Assistant Examiner*—David J. Severin
*Attorney, Agent, or Firm*—Keil & Weinkauf

[57] ABSTRACT

An information disk store possesses an air circulation system in a substantially sealed housing, by means of which system, which includes a channel for directing air to the end of the hub on which the disks are mounted, and a low-pressure compartment that is shut off from the disk compartment by a main filter, a first positive pressure gradient from the bottom to the top of the housing is set up in the peripheral space adjacent to the disks. It is advantageous to also set up a second positive pressure gradient in the direction of rotation of the disks, in the peripheral space adjacent to the disks. The novel air circulation system can be used with advantage in all information disk storage systems in which the write and read operations may be adversely affected by dust and dirt.

6 Claims, 4 Drawing Figures

PLURAL-DISK ROTATABLE DISK MEMORY WITH AIR CIRCULATION SYSTEM

This application is a continuation of application Ser. No. 06/513,250, filed on July 13, 1983, now abandoned.

The present invention relates to an information disk store, more especially a magnetic disk memory, having a substantially sealed housing which contains a plurality of disks arranged at a distance from one another on a rotatably mounted hub, and an air circulation system by means of which the air centrifugally driven outwards during rotation of the disks is passed through a filter and cleaned, and the cleaned air is recirculated to a point which is at least in the vicinity of the center of rotation of the disks.

An article in Review of the Electrical Communication Laboratories, 28, Nos. 5 and 6 (May-June 1980), 371 describes a disk drive having an open air-flow system which serves mainly as a cooling system. A disadvantage of this known air-flow system is that particles of dust and dirt can enter the housing, for example via the bearings for the drive shaft, and reach the disk surfaces, thus causing read/write errors. The distribution of air between the individual disks in this known system for drives for disk packs cannot, in practice, prevent the said write/read errors.

U.S. Pat. No. 4,282,554 discloses an air-flow system for magnetic disk drives, in which the air pressure below the sole magnetic disk is higher than that above the disk, so that dirt which could otherwise enter the disk housing at the drive shaft is kept out of the housing.

It is an object of the present invention to improve the air-flow systems of conventional magnetic disk memories, with a view to reducing the number of write/read errors, in spite of the fact that no maintenance is required.

We have found that this object is achieved, according to the invention, with an information disk store having a substantially sealed housing which contains a plurality of disks arranged at a distance from one another on a rotatably mounted hub, and an air circulation system by means of which the air centrifugally driven outwards during rotation of the disk is passed through filtering means and cleaned, and the cleaned air is recirculated to a point which is at least in the vicinity of the center of rotation of the disks, wherein the air circulation system sets up, in the peripheral space adjacent to the disks, a positive pressure gradient from the bottom to the top of the housing.

As a result, the creation of an inwardly extending pressure gradient at the housing walls, in particular in the vicinity of joints in the housing, and in the vicinity of bearings or shaft seals, can be prevented in an advantageous manner.

If the disk hub is essentially thimble-shaped and arranged vertically, surrounds the bearings for the drive shaft and possesses orifices at least in its top wall, the formation of an area of low pressure above the bearings can be prevented, so that the drawing in of dirt particles from the bearings, or from outside via the bearings, into the housing is effectively prevented.

Favorable flow, pressure and temperature conditions are created if radial openings are provided for the passage of cleaned air from the center of rotation of the magnetic disks across the surfaces of the disks. This principle for magnetic disk stores is disclosed in German Pat. No. 2,023,236. For disk stores of the present invention it is advantageous if the positive pressure gradient from the bottom to the top of the housing is from about 0.1 mbar to about 0.2 mbar and is preferably about 0.15 mbar. This ensures a very steady flow of air and very good air circulation, and results in extreme cleanliness of the circulating air, without adding to the cost of production of the disk store.

In an advantageous embodiment of the disk store, a low-pressure compartment is provided in the housing outside the peripheral space adjacent to the disks and is separated from the disk compartment by a main filter. As a result of this design, the circulating air is automatically drawn through the filter and cleaned, especially if the maximum pressure in the housing is produced above the main filter. The pressure is advantageously from about 0.2 to about 0.35 mbar, preferably from about 0.25 to about 0.3 mbar.

In a further embodiment, a breather filter connects the interior of the housing to the atmosphere, and an air supply channel is provided which is preferably sealed off from the disk compartment and extends from a point which is at least near the breather filter to a point which is at least near the center of rotation of the disks, the air supply channel being advantageously arranged above the stack of disks.

Moreover, it has proved advantageous to establish a further positive pressure gradient ranging from about 0.1 to about 0.35 mbar, preferably from about 0.15 to about 0.3 mbar, in the peripheral space adjacent to the disks and in the direction of rotation of the disks, which pressure gradient extends into the space above the main filter.

Advantageously, a duct connects the low-pressure compartment to the supply channel, so that cleaned circulating air can be fed to the center of rotation of the disks. Cleaned air from the atmosphere also passes to the center of rotation via the supply channel.

According to the present invention, at least the peripheral space adjacent to the disks is sealed off from the supply channel. The said peripheral space is advantageously connected to the low-pressure compartment via an air duct and the main filter. This results in a very stable positive pressure gradient from the bottom to the top of the housing.

The invention can be used not only for magnetic disks but also for any other kind of rigid or flexible disk record where the recording/playback operations by, for example, optical and/or mechanical and/or electrical means may be impaired by dust or dirt particles. Accordingly, the invention encompasses all such information recording/playback systems, regardless of the nature and form of the particular information signals.

Figure 2:
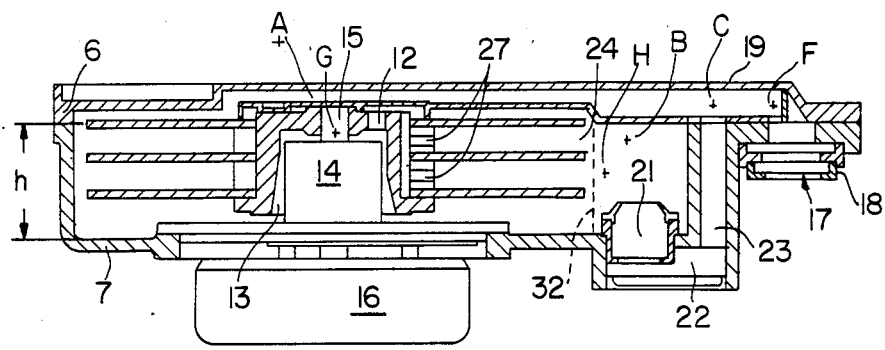
Figure 3:
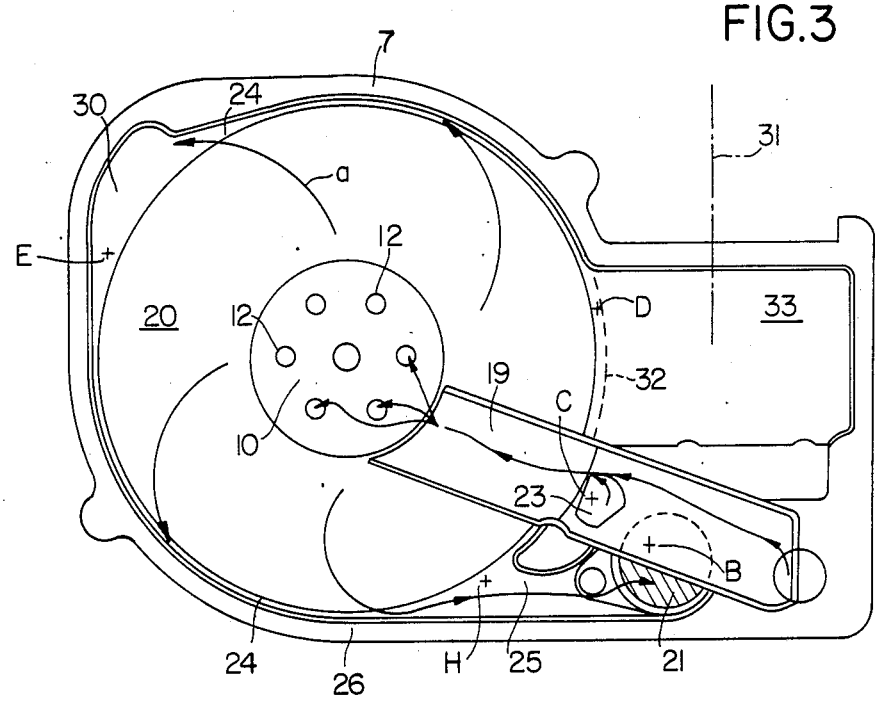
Figure 4:
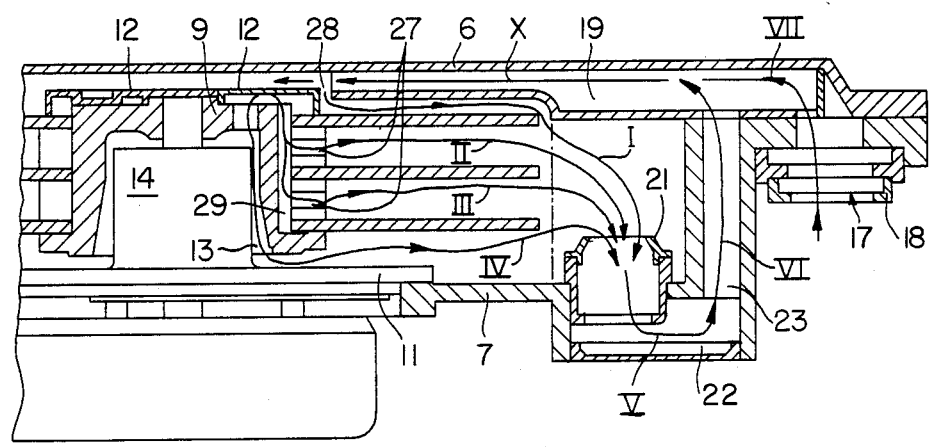

Further details of the invention are disclosed in the following description of a magnetic disk memory given by way of example and illustrated in the accompanying drawings, in which FIG. 1 is a perspective view, partially broken and cut away, of a magnetic disk memory according to the invention, FIG. 2 shows a diagrammatic longitudinal section through the magnetic disk memory of FIG. 1, FIG. 3 is a diagrammatic plan view of the magnetic disk memory of FIG. 1, with the housing cover removed, and FIG. 4 is an enlarged, partial cross-sectional view of the novel magnetic disk memory.

A magnetic storage module 5 of the fixed-disk type comprises the following parts: a cover 6 sits on a bottom portion 7, with a suitably sealed joint 8 between these two housing parts. A securing plate 10 is attached to a hub 9, and is provided with inlet openings 12 which extend axially through the top wall of the hub 9 and open into the space between the hub 9 and a housing 14 for the bearings for the drive shaft 15. The hub 9 is rigidly attached to the shaft 15. The hub 9 carries three magnetic disk 20 for recording digital information for instance, hereafter simply referred to as "disks", and is driven by means of the shaft 15. The drive motor 16 is located beneath the bottom portion 7 of the housing, but it can in principle also be located above the cover 6.

A positioning system for magnetic heads serving as scanning means is not shown. The dashed line 31 merely serves to indicate the central axis of the actuator motor for the positioning mechanism.

The housing formed by parts 6 and 7 has an aperture 17 which connects breather filter 18 to the atmosphere: this aperture principally serves to admit outside air, but also allows air to leave the housing, and communicates with an air supply channel 19. This supply channel 19, which is closed on four sides, runs from one corner of the housing roughly radially over the disks 20 and terminates close to the securing plate 10 with its inlet openings 12, which on rotation of the disks 20 form the air intake center which substantially coincides with the center of rotation of the disks 20.

In addition to the breather filter 18, an internal or main filter 21 is provided, which is located at a distance from the periphery of the disks 20 and shuts off a low-pressure compartment 22 from the disk compartment. The compartment 22 is connected to the supply channel 19 via duct 23, which, for clarity's sake, is shown out of line with the duct in FIG. 3. It is also possible and advantageous, in order to achieve a marked reduction in the size of the housing, i.e. to reduce the size of the lateral housing portion 33 by about 50%, to locate the main filter 21 and low-pressure compartment 22 in the bulge 30 in the housing wall, and to suitably rearrange the air supply channel 19.

The way in which the air circulation system functions will now be described. This system is essentially a closed one, since, apart from the breather filter 18, no connection to the atmosphere is provided, as a result of which the incoming or outgoing stream of air is relatively small.

On rotation of the disks 20, the air surrounding them is centrifugally driven outwards, as indicated by the arrows (a) in FIG. 3. A peripheral space 24, defined by an imaginary line joining the peripheries of the disks 20 on the one hand, and the inner walls of the housing on the other, is essentially ring-shaped and extends from the upper surface of the bottom portion 7 to the cover 6 of the housing. The air which is driven centrifugally outwards flows into this peripheral space 24, from where most of it passes into an air duct 25 which is arranged in the vicinity of the side wall 26 (FIG. 3). Owing to the shape of the air duct 25, there is a build-up of pressure which reaches its maximum value above the main filter 21, this being preferentially the highest pressure within the housing. As a result, the supply of circulating air to the filter 21 and hence to the low-pressure compartment 22 is ensured, the air being constantly cleaned as it passes through the filter 21.

In FIG. 4, air streams I and IV are present above and below the stack of disks if radial apertures 27 are not provided between the individual disks. In this case, air stream I enters the gap 28 between the securing plate 10 and the end of the supply channel 19, passes between the lower surfaces of the supply channel 19 and housing cover and the upper surface of the upper disk 20 and finally arrives at the main filter 21. Air stream IV, after entering the inlet openings 12, passes through the annular space 13 between the hub 9 and the bearing housing 14 and travels, between the lower surface of the lower disk 20 and the upper surface of the mounting plate 11, which is fastened to the bottom portion 7 of the housing, and the upper surface of said bottom portion to the main filter 21. These two air streams I and IV alone suffice to produce good air flow characteristics. Turbulence is substantially avoided and laminar flow is achieved. The good air flow characteristics in conjunction with the pressure conditions preselected in accordance with the invention ensure that the air is clean and that constant temperature conditions prevail inside the housing.

The cleaning and temperature-stabilizing effects can be further improved by the provision of radial apertures 27 in the spacer members between the individual disks 20, since they increase the air throughput through the inlet openings to the main filter 21. The individual streams II and III are created by the apertures 27 which can of course be distributed around the entire periphery of the spacer members.

As may be seen in FIG. 4, the air flows through the inlet openings 12 in the securing plate 10 and thereafter flows between the hub 9 and the spacer members, for example through axial channels 29, to the apertures 27, from where it spreads, in each case, over the upper surface of the lower disk and the lower surface of the upper disk.

The air streams I and IV, or I to IV, reach the main filter 21, are cleaned and pass, as a single stream V, into the low-pressure compartment 22. From there, the cleaned stream of air VI enters the supply channel 19 and is combined there with a make-up air stream VII which has also been cleaned, namely by the breather filter 18.

The stream X formed by streams VI and VII then enters the air intake center or, to be more precise, the inlet openings 12 in the securing plate 10, and the process of air circulation and filtering recommences.

It has proved very advantageous to generate specific pressures at certain points inside the housing, i.e. to ensure, by appropriately designing the housing, etc., that certain pressure conditions are set up at the predetermined speed of rotation of the disks.

To achieve this, the arrangement and shape of the channels and ducts, the number thereof, the seals employed, etc., can be varied.

FIGS. 2 and 3 show points A to H at which the air pressures shown below were measured, at a disk speed of 3,600 rpm and a disk diameter of about 13 cm:

| | |
|---|---|
| A | −0.25 mbar (at the inlet openings 12) |
| G | −0.1 mbar (just above the bearing housing 14) |
| B | +0.25 to 0.3 mbar (above the main filter 21) |
| D | +0.1 to 0.15 mbar (at about half the height of the housing) |
| C | −0.05 mbar (at the junction of the supply channel 19 and duct 23) |
| F | ±0 mbar (above the breather filter 18 in the supply channel 19) |
| E | +0.2 mbar (in the bulge 30) |
| H | +0.22 mbar (roughly at the entrance to the duct 25) |
| D' | ±0 mbar (roughly in the vicinity of the bottom below point D) (similarly, E', H' are below the points E | and H).

The pressures were measured by means of a manometer (Model No. 10504 - measurement range: −1.0 mbar to +1.0 mbar; accuracy of measurement: 0.01 mbar) manufactured by Revue Thommen AG, Waldenburg, Switzerland.

We have found, surprisingly, that good air circulation is achieved if the positive pressure gradient in the peripheral space 24 extends upwardly roughly over the distance h, where h is the distance from the upper surface of the bottom portion 7 to the upper disk 20 (cf. FIG. 2), this pressure gradient being from about 0.1 mbar to about 0.2 mbar, preferably about 0.15 mbar (cf. the pressures at points D and E relative to the pressure of about ±0 to about +0.05 mbar near the bottom of the housing.

At the air intake center (inlet openings 12), a reduced pressure of −0.25 mbar is produced by, for example, appropriate choice of the number and size of the openings 12, of the axial channels 29 and of the apertures 27, so as to achieve a steady flow of recirculating air. The circulating air leaving the peripheral space 24 is removed via the air duct 25, so that the highest pressure in the housing is produced at point B.

In the direction of rotation of the disks, indicated by arrows a showing the direction of air flow, the pressure should increase from D (0.1 or 0.15 mbar) through E (0.2 mbar) and H (0.22 mbar) to B (0.25 or 0.3 mbar), so that here a further positive pressure gradient, of from about 0.1 to about 0.35 mbar, is produced, preferably in the upper zone of the housing. This determines the direction of flow of the air leaving the disk compartment. In the supply channel 19, the pressure at point F, at the beginning of the channel, is advantageously the same as the external pressure (0 mbar), while at point C there is a barely perceptible negative pressure (−0.05 mbar) which suffices to draw the circulating air out of the duct 23. The supply channel 19 is advantageously sealed off from the peripheral space 24 and is only open at the hub end and the breather filter end and at the point where it is joined by duct 23. In this way, the pressure conditions (pressure gradients in the vertical direction and the direction of rotation of the disks) can be kept extremely stable, and consequently a constant temperature difference of about 15° C. relative to the prevailing external temperature can also be maintained. Moreover, very uniform temperature distribution throughout the housing is achieved. The positive pressure prevailing in particular in the upper section of the peripheral space and in the housing portion 33 containing the positioning device (dashed line 31) makes it possible to locate the joint between the housing parts at the top of the housing, and, in conjunction with suitable gaskets, to avoid dust being sucked into the housing, as is normally the case.

In the illustrated embodiments, the positioning device is located inside the housing and is thus included in the clean zone section thereof. The actuator motor the axis of which is indicated by line 31 in FIGS. 1 and 3 is advantageously fastened to the outside of the housing formed by parts 6 and 7. It is however also possible, as shown by the dashed line 32 in FIG. 3, to seal the peripheral space 24 off from the lateral housing portion 33 containing the positioning device, good flow conditions also being obtained.

The individual parts of the storage module 5 which have been described are made of appropriate materials, especially heat-conductive materials, as illustrated by way of example by the die-cast housing in FIG. 1. The good flow conditions and efficacy of the filtering means described above have been confirmed by means of smoke tests. These showed that the smoke-filled interior of the housing was cleared of smoke very rapidly after the apparatus had been switched on, soiling of the main filter being observed. Moreover, a substantial air throughput was observed, but this depended on the type of main filter and on the pressure differential prevailing at the filter.

We claim:

1. A rotatable disk memory apparatus comprising
a substantially sealed housing having a bottom section and a top section with joints therebetween,
in said housing a substantially thimble-shaped hub mounting a plurality of mutually spaced disks for rotation with said hub, said disks forming together with said hub a disk assembly,
a drive shaft secured to said hub,
motor means mounted outside of said housing for rotating said hub by means of said drive shaft, said shaft being rotatably mounted in bearing means and said bearing means being surrounded by said thimble-shaped hub, and
an air circulating system having air-flow determining elements including
an outer peripheral space adjacent to the disk assembly,
beyond said peripheral space and near the bottom of said housing a vertically downwardly oriented filter means for cleaning the centrifugally driven air,
a low pressure compartment beyond and below said filter means,
a breather filter connecting the interior of the housing to atmosphere,
an air supply channel located near the top of said housing and extending from beyond the filter means to near the center of rotation of the disk assembly, and
a substantially vertically extending duct connecting said low pressure compartment with said supply channel and said breather filter,
the air flow determining elements of said system being designed so that in said peripheral space a first, low air pressure is generated at the bottom of the housing, and a second, higher air pressure near the top of the housing, said joints being located in the zone of said second air pressure near the top of the housing to preclude contaminants from entering into the housing,
orifices being provided in the top side of the thimble-shaped hub for permitting the air supplied through said channel to enter the inside of said thimble-shaped hub, and a third air pressure approximately equal to that of the first air pressure being generated on the inside of the hub adjacent the bearing means whereby the build-up of a considerable negative air pressure, relative to atmosphere, on the inside of the hub is avoided and hence contamination of the inside of the hub by air entering through the bearing means substantially prevented.

2. A disk memory apparatus as claimed in claim 1, wherein the magnitude of the first air pressure is about 0 to +0.05 mbar at the bottom, the magnitude of the second air pressure is about +0.2 mbar and the magnitude of the third air pressure is about −0.1 mbar.

3. A disk memory apparatus as claimed in claim 1, wherein radial openings are provided between the disks for the passage of cleaned air from the center of rotation of the disk assembly across the surfaces of the magnetic disks.

4. A disk memory apparatus as claimed in claim 1, wherein the air supply channel is sealed off from at least the peripheral space adjacent to the disk assembly.

5. A disk memory apparatus as claimed in claim 1, wherein the air pressure also increases circumferentially in the direction of rotation of the disk assembly and wherein the air pressure reaches its highest magnitude in the space above the filter means.

6. A disk memory apparatus as claimed in claim 5, wherein the air pressure set up circumferentially in said peripheral space in the direction of rotation of the disks ranges from about 0.1 to 0.35 mbar.

* * * * *